US012179234B2

(12) United States Patent
Usami et al.

(10) Patent No.: US 12,179,234 B2
(45) Date of Patent: Dec. 31, 2024

(54) ARTICLE SORTING CONTROL APPARATUS, ARTICLE SORTING SYSTEM, AND COMPUTER READABLE STORAGE MEDIUM

(71) Applicants: KABUSHIKI KAISHA TOSHIBA, Tokyo (JP); Toshiba Infrastructure Systems & Solutions Corporation, Kawasaki (JP)

(72) Inventors: Yusuke Usami, Tokyo (JP); Kazuya Saimei, Yokohama (JP)

(73) Assignees: Kabushiki Kaisha Toshiba, Tokyo (JP); Toshiba Infrastructure Systems & Solutions, Corporation, Kawasaki (JP)

( * ) Notice: Subject to any disclaimer, the term of this patent is extended or adjusted under 35 U.S.C. 154(b) by 590 days.

(21) Appl. No.: 17/552,092

(22) Filed: Dec. 15, 2021

(65) Prior Publication Data

US 2022/0105543 A1 Apr. 7, 2022

Related U.S. Application Data

(63) Continuation of application No. PCT/JP2020/024538, filed on Jun. 23, 2020.

(30) Foreign Application Priority Data

Jun. 24, 2019 (JP) ................................ 2019-116710

(51) Int. Cl.
*B07C 3/14* (2006.01)
*B07C 3/08* (2006.01)
(Continued)

(52) U.S. Cl.
CPC .................. *B07C 3/08* (2013.01); *B07C 3/14* (2013.01); *B65G 47/493* (2013.01); (Continued)

(58) Field of Classification Search
CPC .... B07C 3/14; B65G 47/493; B65G 47/5104; B65G 47/684; G05B 19/4189; G05B 2219/45047; G05B 2219/45054
See application file for complete search history.

(56) References Cited

U.S. PATENT DOCUMENTS

| | | | | |
|---|---|---|---|---|
| 6,513,641 | B1 * | 2/2003 | Affaticati | B07C 5/36 198/444 |
| 2003/0136638 | A1 | 7/2003 | Affaticati et al. | |

(Continued)

FOREIGN PATENT DOCUMENTS

| | | | |
|---|---|---|---|
| EP | 2517994 | A1 | 10/2012 |
| JP | 10-218352 | A | 8/1998 |

(Continued)

OTHER PUBLICATIONS

International Search Report issued Sep. 15, 2020 in PCT/JP2020/024538, filed on Jun. 23, 2020, 2 pages.

(Continued)

*Primary Examiner* — Kyle O Logan
(74) *Attorney, Agent, or Firm* — Maier & Maier, PLLC

(57) ABSTRACT

An article sorting control apparatus includes a memory, a processor, and a communication interface. The memory stores sorting destination management information including reference conveyance route information, fixed sorting destination information, and dynamic sorting destination information. The processor selects a first diverging control signal or a second diverging control signal. The communication interface transmits the first or the second diverging control signal to an article sorting apparatus.

10 Claims, 7 Drawing Sheets

(51) Int. Cl.
*B65G 47/49* (2006.01)
*B65G 47/51* (2006.01)
*B65G 47/68* (2006.01)
*G05B 19/418* (2006.01)

(52) U.S. Cl.
CPC ....... *B65G 47/5104* (2013.01); *B65G 47/684* (2013.01); *G05B 19/4189* (2013.01); *G05B 2219/45047* (2013.01); *G05B 2219/45054* (2013.01)

(56) References Cited

U.S. PATENT DOCUMENTS

| | | | | | |
|---|---|---|---|---|---|
| 2006/0037888 | A1* | 2/2006 | Wheeler | B07C 3/02 | 209/12.1 |
| 2011/0048894 | A1* | 3/2011 | Doane | B65G 47/506 | 198/460.1 |
| 2011/0231652 | A1* | 9/2011 | Bollay | G06F 21/606 | 713/153 |
| 2012/0273399 | A1* | 11/2012 | Daboub | B07C 3/00 | 209/552 |
| 2014/0364998 | A1* | 12/2014 | Neiser | B65G 43/08 | 700/230 |
| 2015/0143456 | A1* | 5/2015 | Raleigh | H04L 63/20 | 726/1 |
| 2020/0130945 | A1* | 4/2020 | Deuser | B65G 35/06 | |

FOREIGN PATENT DOCUMENTS

| | | | |
|---|---|---|---|
| JP | 2003-511322 | A | 3/2003 |
| JP | 2009-62142 | A | 3/2009 |
| JP | 2013-245087 | A | 12/2013 |
| JP | 2014-39891 | A | 3/2014 |
| JP | 2015-34064 | A | 2/2015 |

OTHER PUBLICATIONS

Office Action issued on Dec. 9, 2022, in corresponding Singapore Application No. 11202113680S, 9 pages.
Extended Search Report issued on Mar. 28, 2023, in corresponding European Application No. 20832781.7, 6 pages.

* cited by examiner

ARTICLE SORTING CONTROL APPARATUS, ARTICLE SORTING SYSTEM, AND COMPUTER READABLE STORAGE MEDIUM

CROSS REFERENCE TO RELATED APPLICATIONS

This application is a Continuation Application of PCT Application No. PCT/JP2020/024538, filed Jun. 23, 2020 and based upon and claiming the benefit of priority from Japanese Patent Application No. 2019-116710, filed Jun. 24, 2019, the entire contents of all of which are incorporated herein by reference.

FIELD

Embodiments described herein relate generally to an article sorting control apparatus, an article sorting control program, and an article sorting system.

BACKGROUND

Sorting systems for automating the sorting of articles, such as luggage, have become widespread. For example, the sorting system reads an image of an article conveyed along a main conveyance path, recognizes destination information included in the image, and designates a sorting destination according to a destination recognition result. The sorting system feeds an article from the main conveyance path to a circulation conveyance path, and sorts the article to a sorting destination according to a destination recognition result of the article circulated and conveyed by the circulation conveyance path.

DETAILED DESCRIPTION

According to an embodiment, an article sorting control apparatus includes a memory, a processor, and a communication interface. The memory stores sorting destination management information for conveying an article from a main conveyance path to a circulation conveyance path, via one of a first conveyance route connected to the circulation conveyance path from the main conveyance path via a first sub-conveyance path, and a second conveyance route connected to the circulation conveyance path from the main conveyance path via a second sub-conveyance path, and for sorting the article to a designated sorting destination among a plurality of sorting destinations while circulating the article in one direction via the circulation conveyance path, the sorting destination management information including reference conveyance route information to allocate one of the first conveyance route and the second conveyance route in accordance with each of the sorting destinations, fixed sorting destination information associating a fixed sorting destination among the destinations to a destination, and dynamic sorting destination information associating a dynamic sorting destination among the sorting destinations to a destination that is allocated in accordance with a situation. The processor selects a first diverging control signal or a second diverging control signal based on a designated sorting destination of the article acquired from information read from the article, the sorting destination management information, and degree of congestion of the first and second sub-conveyance paths, and to allocate an arbitrary destination to the dynamic sorting destination. The communication interface transmits the first or the second diverging control signal selected by the processor to an article sorting apparatus configured to distribute the article from the main conveyance path to the first or the second sub-conveyance path based on the first or the second diverging control signal.

Hereinafter, an embodiment will be explained with reference to the accompanying drawings.

Figure 1:
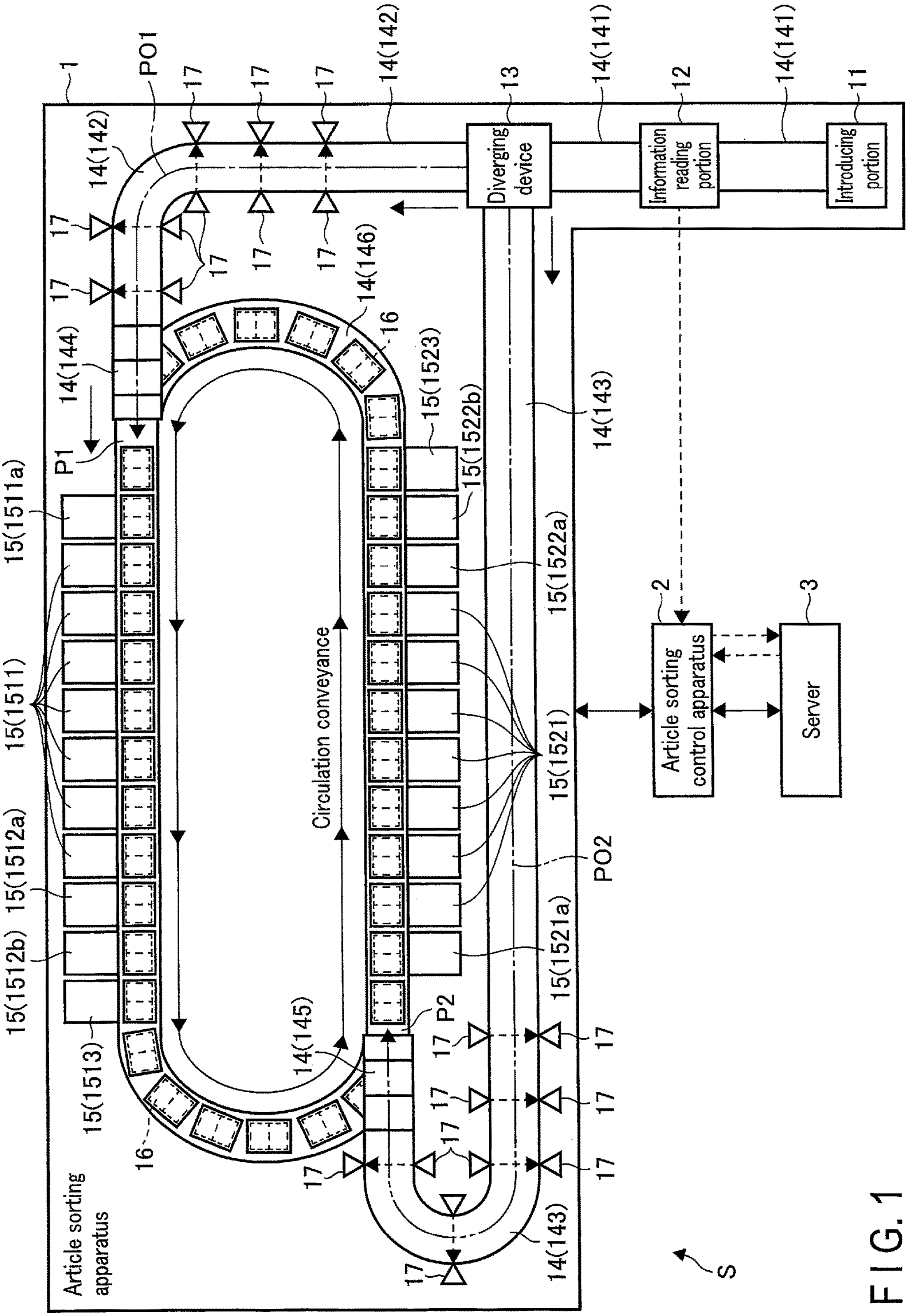
FIG. 1 is a diagram illustrating an example of a schematic configuration of an article sorting system according to an embodiment.

FIG. 1 is a diagram illustrating an example of a schematic configuration of an article sorting system according to an embodiment.

As shown in FIG. 1, an article sorting system S includes an article sorting apparatus 1, an article sorting control apparatus 2, and a server 3. The article sorting apparatus 1 sequentially conveys and diverges a plurality of articles, and sorts the articles to designated sorting destinations based on a sorting destination determination result of the articles. The article sorting control apparatus 2 controls article processing (conveyance, divergence, sorting, and the like) performed by the article sorting apparatus 1. The server 3 recognizes destination information or the like of the article from an image of the article.

The article sorting apparatus 1 includes an introducing portion 11, an information reading portion 12, and a diverging device 13. Further, the article sorting apparatus 1 comprises various conveyors 14. For example, the conveyors 14 include a main conveyor 141 corresponding to a main conveyance path, a first buffer conveyor 142 corresponding to a first sub-conveyance path, a second buffer conveyor 143 corresponding to a second sub-conveyance path, a first timing adjustment conveyor 144, a second timing adjustment conveyor 145, and a circulation conveyor 146 corresponding to a circulation conveyance path.

The article sorting apparatus 1 includes a plurality of sorting chutes 15 corresponding to a plurality of sorting destinations, and a chuter 16 that feeds articles to each sorting chute 15. The sorting chute 15 includes first fixed sorting chutes 1511 and 1511*a* of an area A, first dynamic sorting chutes 1512*a* and 1512*b* of the area A, and a first reject sorting chute 1513 of the area A, as well as second fixed sorting chutes 1521 and 1521*a* of an area B, second dynamic sorting chutes 1522*a* and 1522*b* of the area B, and a second reject sorting chute 1523 of the area B. Each sorting chute 15 is provided with a plurality of article detection sensors that detect articles contained therein, and article detection signals from the plurality of article detection sensors are output to a processor 21. The processor 21 monitors the article detection signals from the article detection sensors of each sorting chute 15 and detects whether or not the free space in each sorting chute 15 exceeds a reference value. In other words, the processor 21 detects whether or not there is a vacancy in each sorting chute 15 based on the article detection signals from the article detection sensors of each sorting chute 15.

The article sorting apparatus 1 further includes a plurality of article detection sensors that detect articles on the main conveyor 141, the first buffer conveyor 142, the second buffer conveyor 143, the first timing adjustment conveyor 144, the second timing adjustment conveyor 145, and the circulation conveyor 146 corresponding to the circulation conveyance path. For example, the article sorting apparatus 1 includes a plurality of article detection sensors 17 that detect articles on the first buffer conveyor 142 and articles on the second buffer conveyor 143.

For example, the article sorting control apparatus 2 can be realized by one computer or a combination of a plurality of computers, communicates with other apparatuses in a wired or wireless manner, receives and stores information from the other apparatuses, transmits a control signal or the like to the other apparatuses, and controls the other apparatuses. For example, the other apparatuses are the article sorting apparatus 1 and the server 3.

The article sorting control apparatus 2 monitors article detection signals from a plurality of article detection sensors, traces the conveyance (movement) of each article, and detects or estimates where each article is located. Further, the article sorting control apparatus 2 allocates article detection identification information (hereinafter referred to as an article detection ID (identification information)) to each article detected by the plurality of article detection sensors (each article sequentially introduced from the introducing portion 11).

The articles processed by the article sorting system S include packages of various sizes, shapes, and weights. Destination information (such as a destination address) is recorded in each article, and article identification information (hereinafter referred to as an article ID) is allocated to each article in advance. For example, the destination information is directly or indirectly recorded for each article, and the article ID is directly or indirectly recorded for each article. The article ID may be an article ID recorded by a recording method of either visible printing or invisible printing with ink that absorbs infrared rays or the like. Alternatively, an electronic tag or a wireless tag storing the article ID may be attached to the article.

The article ID at a minimum includes unique information and is constituted by one or a combination of two or more of a number, a character, a symbol, a bar code, a two-dimensional code, and a QR code (registered trademark). The article sorting control apparatus 2 stores an article management table for managing an article ID allocated to each article and destination information read and recognized from each article in association with each other. Further, the article sorting control apparatus 2 stores a sorting management table that associates destination information with each sorting chute 15.

For example, the server 3 can be realized by one computer or a combination of a plurality of computers, communicates with other apparatuses in a wired or wireless manner, receives and stores information from the other apparatuses, transmits a control signal or the like to the other apparatuses, and controls the other apparatuses. For example, the other apparatus is the article sorting control apparatus 2. The server 3 receives image information of an article, recognizes destination information or the like of the article from the image information, and returns a destination recognition result.

The sorter constituted by the circulation conveyor 146 of the article sorting apparatus 1 may be a cross belt sorter, a sliding shoe sorter, or a bomb-bay sorter. The cross belt sorter conveys an article via a conveyance tray constituted by a belt conveyor, and supplies an article on the conveyance tray to a target sorting chute 15 by the rotation of the belt conveyor. The sliding shoe sorter conveys an article by a conveyance tray, inclines the conveyance tray at a timing when the conveyance tray reaches a target sorting chute 15, and slides the article on the conveyance tray toward the target sorting chute 15. The bomb-bay sorter conveys an article via a conveyance tray having a bottom portion configured to be openable and closable, opens the bottom portion at a timing when the conveyance tray reaches a target sorting chute 15 or a chuter 16 for feeding the article to the target sorting chute 15, and drops the article toward the target chuter 16.

This embodiment will be described on the assumption that the sorter constituted by the circulation conveyor 146 is the bomb-bay sorter. The circulation conveyor 146 circulates and conveys a plurality of conveyance trays. Each conveyance tray circulated and conveyed by the circulation conveyor 146 loads and conveys an article fed by the first timing adjustment conveyor 144, and loads and conveys the article fed by the second timing adjustment conveyor 145. A single conveyance tray loads and conveys one article.

Here, an article conveyance route by each conveyor 14 of the article sorting apparatus 1 will be described. The article conveyance route includes a conveyance route RO1 (first conveyance route) and a conveyance route RO2 (second conveyance route). As shown in FIG. 1, the conveyance route RO1 is a route from the main conveyor 141 to the circulation conveyor 146 via the first buffer conveyor 142, the first timing adjustment conveyor 144, and a first merging point P1 in order. The conveyance route RO2 is a route from the main conveyor 141 to the circulation conveyor 146 via the second buffer conveyor 143, the second timing adjustment conveyor 145, and a second merging point P2 in order. The article sorting apparatus 1 conveys an article to the circulation conveyor 146 by one of the conveyance route RO1 and the conveyance route RO2, and the circulation conveyor 146 circulates the article in one direction to sort the article to each sorting chute 15.

The introducing portion 11 receives an article introduced by an operator or an article fed by a conveying belt or the like, and the main conveyor 141 conveys the article received by the introducing portion 11 to the information reading portion 12.

The information reading portion 12 includes a camera, captures an image of an article from an upper surface, a side surface, and a lower surface of the article by the camera, and outputs image information to the article sorting control apparatus 2. The information reading portion 12 measures the size, shape, weight, and the like of the conveyed article, and outputs article measurement information obtained by the measurement to the article sorting control apparatus 2. Furthermore, the information reading portion 12 reads the article ID from the article and outputs the read article ID to the article sorting control apparatus 2. When the article ID is a QR code, the information reading portion 12 functions as a QR code reader. When the article ID is information stored in the wireless tag, the information reading portion 12 functions as a wireless reader and reads the article ID from the wireless tag by wireless communication. The main conveyor 141 conveys the article to the diverging device 13.

The diverging device 13 distributes articles from the main conveyor 141 to the first buffer conveyor 142 based on a diverging control signal S11 transmitted from the article sorting control apparatus 2, and distributes articles from the main conveyor 141 to the second buffer conveyor 143 based on a diverging control signal S12 transmitted from the article sorting control apparatus 2.

The first buffer conveyor 142 and the second buffer conveyor 143 are separately driven, so as to accumulate articles without a clearance. The first timing adjustment conveyor 144 receives the articles from the first buffer conveyor 142 and feeds the articles toward the empty conveyance trays of the circulation conveyor 146 at the merging point P1. Similarly, the second timing adjustment conveyor 145 receives the articles from the second buffer conveyor 143 and feeds the articles toward the empty conveyance trays of the circulation conveyor 146 at the merging point P2.

Figure 2:
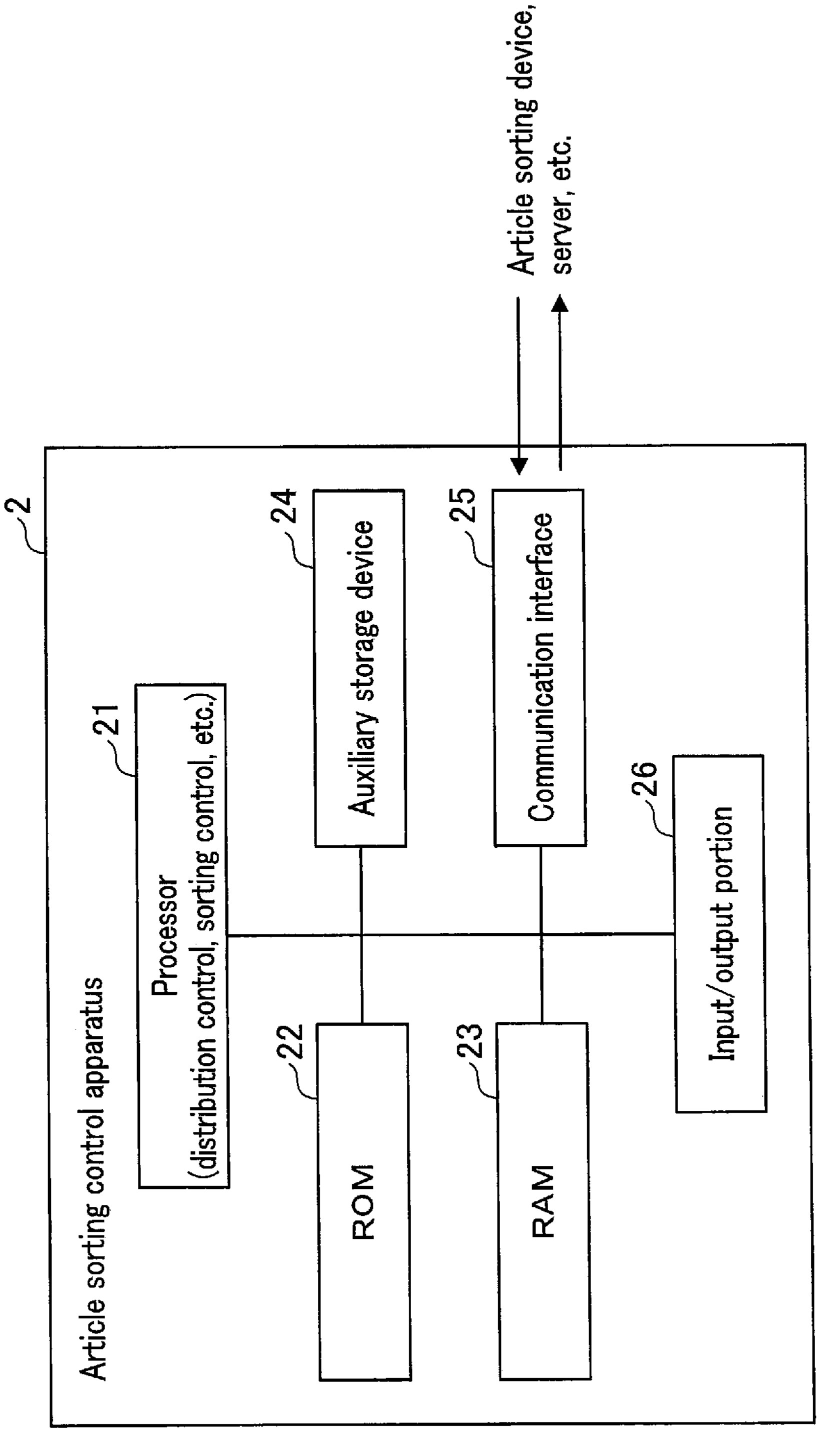
FIG. 2 is a block diagram illustrating an example of a schematic configuration of an article sorting control apparatus constituting the article sorting system according to the embodiment.

FIG. 2 is a block diagram illustrating an example of a schematic configuration of the article sorting control apparatus constituting the article sorting system according to the embodiment.

As illustrated in FIG. 2, the article sorting control apparatus 2 includes the processor 21, a read-only memory (ROM) 22, a random-access memory (RAM) 23, an auxiliary storage device 24, a communication interface 25, and an input/output portion 26.

The processor 21 corresponds to a central portion of a computer that performs processing such as calculation and control necessary for article processing. The processor 21 executes control to realize various functions based on a program such as system software, application software, or firmware stored in at least one of the ROM 22 and the auxiliary storage device 24. The processor 21 is, for example, a central processing unit (CPU), a micro processing unit (MPU), or a digital signal processor (DSP). Alternatively, the processor 21 is a combination of two or more of these.

The processor 21 allocates an article detection ID to each article to be detected based on article detection signals from the article detection sensors, traces the conveyance (movement) of each article, and detects or estimates where each article is located. Further, the processor 21 monitors the amount of movement of the circulation conveyor 146 based on a signal from a rotary encoder that detects the amount of movement of the circulation conveyor 146. For example, the processor 21 detects the number of circulations of the circulation conveyor 146. The processor 21 can also detect the number of circulations of each article by combining the trace of the conveyance of each article and the monitoring of the amount of movement of the circulation conveyor 146.

The ROM 22 is a computer-readable storage medium and corresponds to a main storage device of the computer including the processor 21 as a center. The ROM 22 is a non-volatile memory (non-transitory storage medium) that is exclusively used for reading data. The ROM 22 may store at least a portion of the programs described above. In addition, the ROM 22 stores data or various setting values and the like used when the processor 21 performs various processes.

The RAM 23 is a computer-readable storage medium and corresponds to a main storage device of the computer including the processor 21 as a center. The RAM 23 is a memory used for reading and writing data. The RAM 23 is utilized as a so-called work area for storing data to be temporarily used when the processor 21 performs various processes.

The auxiliary storage device 24 is a computer-readable storage medium and corresponds to an auxiliary storage device of the computer including the processor 21 as a center. The auxiliary storage device 24 is a non-transitory storage medium such as an electric erasable programmable read-only memory (EEPROM) (registered trademark), a hard disk drive (HDD), or a solid state drive (SSD). The auxiliary storage device 24 may store at least a portion of the programs described above. In addition, the auxiliary storage device 24 stores data to be used by the processor 21 when performing various types of processing, data generated by the processing performed by the processor 21, or various setting values, and the like. For example, the auxiliary storage device 24 stores sorting history information for managing a history of destinations and sorting destinations of the respective articles.

The programs stored in at least one of the ROM 22 and the auxiliary storage device 24 include a program for article processing. As an example, the article sorting control apparatus 2 is transferred to an administrator or the like of the article sorting control apparatus 2 with the program being stored in at least one of the ROM 22 and the auxiliary storage device 24. Alternatively, the program may be transferred to the administrator or the like by a non-transitory computer-readable storage medium storing the program. In this case, the program stored in the non-transitory computer-readable storage medium is written to at least one of the ROM 22 and the auxiliary storage device 24 through the operation by the administrator or the service person. The non-transitory computer-readable storage medium storing the program is, for example, a removable storage medium, such as a magnetic disk, a magneto-optical disk, an optical disk, or a semiconductor memory. Alternatively, the program may be downloaded via a network or the like and written to at least one of the ROM 22 and the auxiliary storage device 24.

The communication interface 25 is an interface for performing wired or wireless communication with another apparatus via a network or the like, receiving various types of information transmitted from another apparatus, and transmitting various types of information to another apparatus. For example, the communication interface 25 receives the article IDs from the server 3 before starting the article processing. The communication interface 25 also receives the article detection signals from the article detection sensors, the image information, the article measurement information, and the articles ID from the information reading portion 12. Further, the communication interface 25 transmits the diverging control signal S11 or S12 to the diverging device 13, and transmits sorting destination information (information for specifying the sorting chutes 15) associated with the article IDs to the article sorting apparatus 1.

The input/output portion 26 includes a keyboard, a numeric keypad, a mouse, a touch panel display, and the like. The input/output portion 26 receives an instruction input from the operator and notifies the processor 21 of the instruction input. The touch panel display displays various types of information for the operator.

Figure 3:
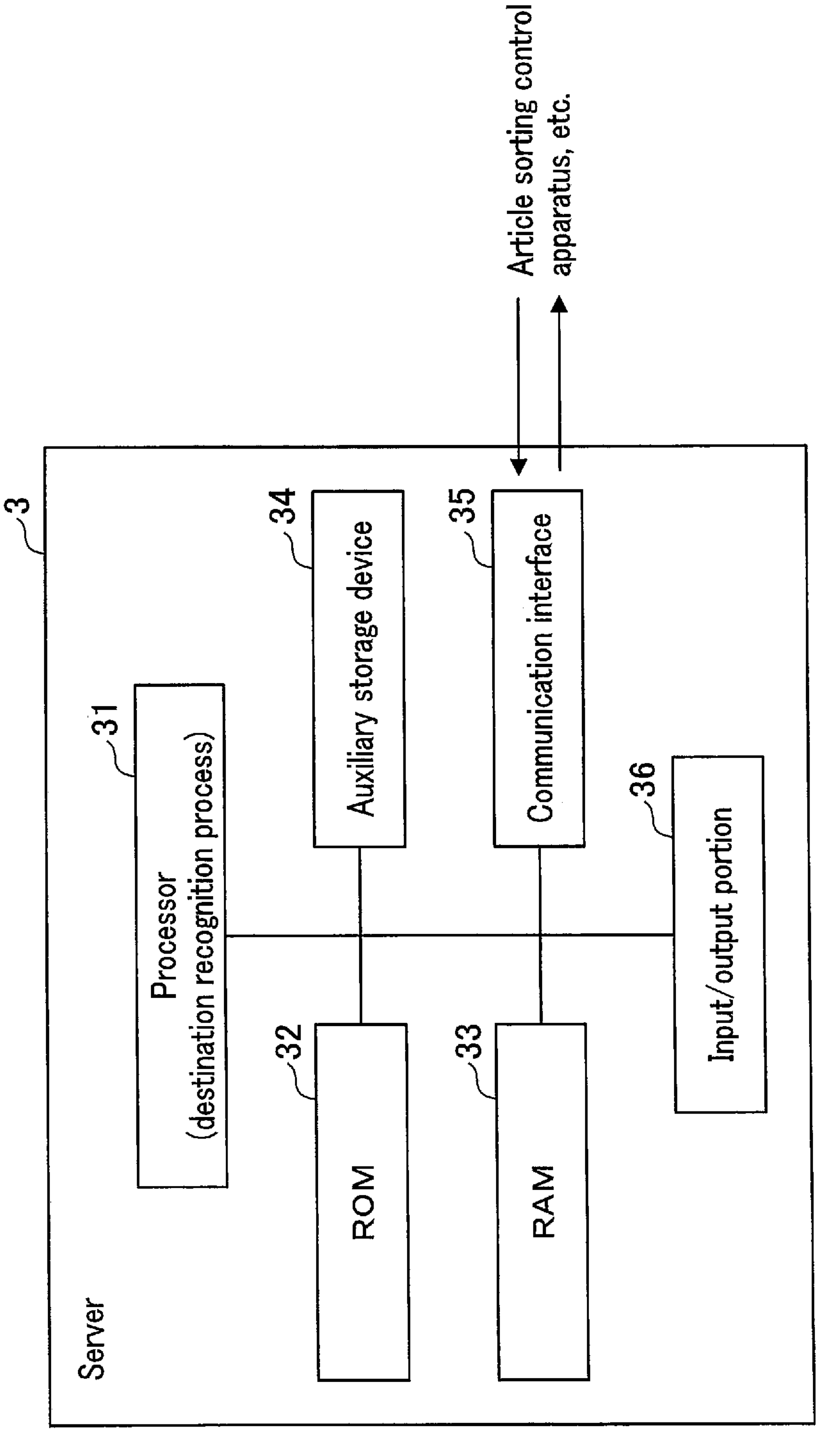
FIG. 3 is a block diagram illustrating an example of a schematic configuration of a server included in the article sorting system according to the embodiment.

FIG. 3 is a block diagram illustrating an example of a schematic configuration of the server included in the article sorting system according to the embodiment.

As illustrated in FIG. 3, the server 3 includes a processor 31, a ROM 32, a RAM 33, an auxiliary storage device 34, a communication interface 35, and an input/output portion 36.

The processor 31 corresponds to a central portion of a computer that performs processing such as calculation and control necessary for article processing. The processor 31 executes control to realize various functions based on a program such as system software, application software, or firmware stored in at least one of the ROM 32 and the auxiliary storage device 34. The processor 21 recognizes destination information included in the image information transmitted from the article sorting control apparatus 2, and outputs a recognition result of the destination information.

The ROM 32 corresponds to a main storage device of the computer including the processor 31 as a center. The ROM 32 is a nonvolatile memory that is used exclusively for reading data. The ROM 32 may store at least a portion of the programs described above. In addition, the ROM 32 stores data or various setting values and the like used when the processor 31 performs various processes.

The RAM 33 corresponds to a main storage device of the computer including the processor 21 as a center. The RAM 33 is a memory used for reading and writing data. The RAM 33 is utilized as a so-called work area for storing data to be temporarily used when the processor 31 performs various processes.

The auxiliary storage device 34 corresponds to an auxiliary storage device of the computer including the processor 31 as a center. The auxiliary storage device 34 may store at least a portion of the programs described above. In addition, the auxiliary storage device 34 stores data to be used by the processor 21 when performing various types of processing, data generated by the processing performed by the processor 31, or various setting values, and the like.

The programs stored in at least one of the ROM 32 and the auxiliary storage device 34 include a program for recognizing destination information from image information.

The communication interface 35 is an interface for performing wired or wireless communication with another apparatus via a network or the like, receiving various types of information transmitted from another apparatus, and transmitting these various types of information to another apparatus. For example, the communication interface 35 receives image information of an article transmitted from the article sorting control apparatus 2, and transmits a recognition result of destination information included in the image information of the article to the article sorting control apparatus 2.

The input/output portion 26 includes a keyboard, a numeric keypad, a mouse, a touch panel display, and the like.

Figure 4:
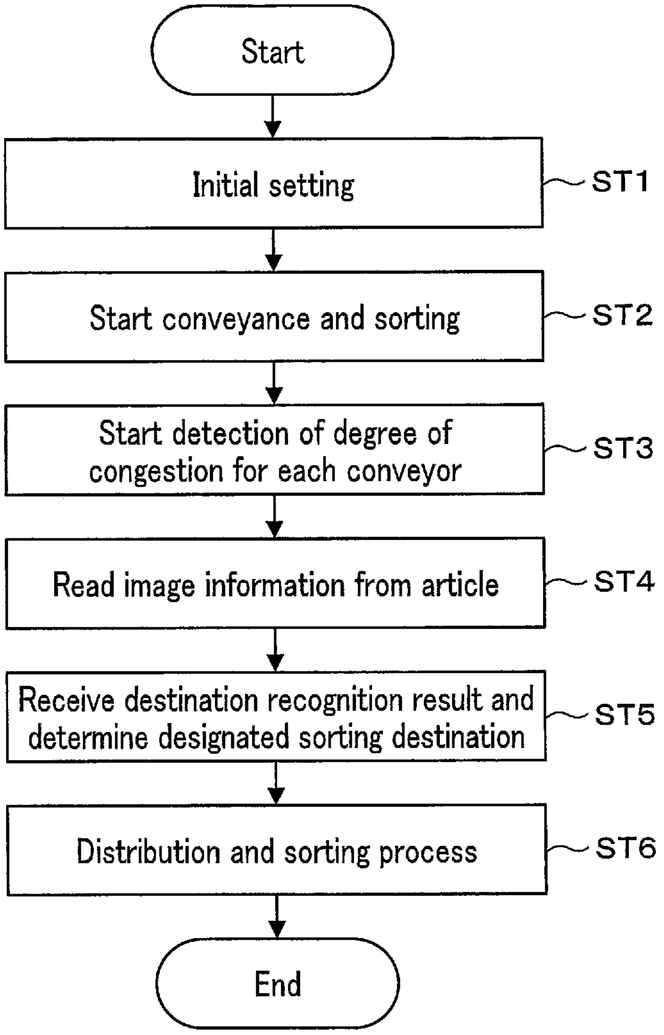
FIG. 4 is a flowchart illustrating an example of an article sorting process performed by the article sorting system according to the embodiment.

FIG. 4 is a flowchart illustrating an example of an article sorting process performed by the article sorting system according to the embodiment.

The processor 21 of the article sorting control apparatus 2 performs initial setting (ST1), allocates a role to each sorting chute 15 of the article sorting apparatus 1, and registers sorting destination management information and a limit on the number of circulations in the auxiliary storage devices 24 or the like. The sorting destination management information includes reference conveyance route information for allocating one of the first buffer conveyor 142 and the second buffer conveyor 143 according to each sorting chute 15. Further, the sorting destination management information includes information on the destination allocated to each sorting chute 15. The destination allocated to each sorting chute 15 is a part of the actual destination. For example, the sorting destination management information includes fixed sorting destination information that associates, among the sorting chutes 15, each of the first fixed sorting chutes 1511 and 1511*a* and the second fixed sorting chutes 1521 and 1521*a* with a destination. Furthermore, the sorting destination management information includes dynamic sorting destination information that associates each of the first dynamic sorting chutes 1512*a* and 1512*b*, and the second dynamic sorting chutes 1522*a* and 1522*b* with a destination allocated in accordance with a situation. The limit on the number of circulations includes information on the limited number of circulations for which the articles are circulated by the circulation conveyor 146.

The processor 21 allocates the first buffer conveyor 142 to the sorting chutes 15 in the area A as the reference conveyance route and allocates the second buffer conveyor 143 to the sorting chutes 15 in the area B as the reference conveyance route.

For example, the processor 21 allocates the reference conveyance route (first buffer conveyor 142) and the destination (destination AD1) to the first fixed sorting chute 1511*a* in the area A, allocates the reference conveyance route (first buffer conveyor 142) and undetermined destinations to the first dynamic sorting chutes 1512*a* and 1512*b* in the area A, and allocates the reference conveyance route (first buffer conveyor 142) and the destination (reject RE1) to the first reject sorting chute 1513 in the area A.

Furthermore, the processor 21 allocates the reference conveyance route (second buffer conveyor 143) and the destination (destination AD2) to the second fixed sorting chute 1521*a* in the area B, allocates the reference conveyance route (second buffer conveyor 143) and undetermined destinations to the second dynamic sorting chutes 1522*a* and 1522*b* in the area B, and allocates the reference conveyance route (second buffer conveyor 143) and the destination (reject RE2) to the second reject sorting chute 1523 in the area B.

The conveyance distance from the merging point P1 to the sorting chutes 15 in the area A is shorter than the conveyance distance from the merging point P2 to the sorting chutes 15 (first fixed sorting chutes 1511, 1511*a*, etc.) in the area A, and the conveyance distance from the merging point P2 to the sorting chutes 15 (second fixed sorting chutes 1521, 1521*a*, etc.) in the area B is shorter than the conveyance distance from the merging point P1 to the sorting chutes 15 in the area B.

Therefore, in a case where the articles are sorted with respect to the sorting chutes 15 in the area A, the conveyance distance and the conveyance time by the circulation conveyor 146 can be shortened by selecting the first buffer conveyor 142 rather than the second buffer conveyor 143. In a case where the articles are sorted with respect to the sorting chutes 15 in the area B, the conveyance distance and the conveyance time by the circulation conveyor 146 can be shortened by selecting the second buffer conveyor 143 rather than the first buffer conveyor 142.

Subsequently, the processor 21 starts conveyance and sorting of the articles by the article sorting apparatus 1 (ST2). Accordingly, the introducing portion 11 starts introducing the articles, and each conveyor 14 starts conveying the articles. For example, the processor 21 outputs a first speed control signal for controlling the first buffer conveyor 142 and the second buffer conveyor 143 to a first conveyance speed, outputs a second speed control signal for controlling the main conveyor 141 to a second conveyance speed, and outputs a third speed control signal for controlling the circulation conveyor 146 to a third conveyance speed. The first buffer conveyor 142 and the second buffer conveyor 143 convey the articles in one direction at the first conveyance speed based on the first speed control signal, the main conveyor 141 conveys the articles in one direction at the second conveyance speed based on the second speed control signal, and the circulation conveyor 146 circulates and conveys the articles in one direction at the third conveyance speed based on the third speed control signal. The second conveyance speed of the main conveyor 141 is greater than the first conveyance speed of the first buffer conveyor 142 and the second buffer conveyor 143, and is, for example, twice the first conveyance speed or greater. The third conveyance speed is equal to the first conveyance speed.

Further, the processor 21 monitors article detection signals from the article detection sensors, traces the conveyance (movement) of each article, detects or estimates where each article is located, allocates an article detection ID to the detected or estimated article, and monitors the article based on the article detection ID. Further, determination or estimation of the degree of congestion of each conveyor 14 is started (ST3). For example, the communication interface 25 receives article detection signals from the article detection sensors 17. The processor 21 detects or estimates the number of articles in the first buffer conveyor 142 and the second buffer conveyor 143 based on the article detection signals from the article detection sensors 17, and determines or estimates the degree of congestion of the articles in the first buffer conveyor 142 and the second buffer conveyor 143. For example, the processor 21 detects a situation in which the degree of congestion of the first buffer conveyor 142 is higher than the degree of congestion of the second buffer conveyor 143, or a situation in which the degree of congestion of the second buffer conveyor 143 is higher than the degree of congestion of the first buffer conveyor 142.

The information reading portion 12 reads an image of the conveyed article and transmits the read image information to the article sorting control apparatus 2, and the communication interface 25 of the article sorting control apparatus 2 receives the image information and transmits the received image information to the server 3. The information reading portion 12 may transmit the read image information directly to the server 3. When an article ID is given to the conveyed article, the information reading portion 12 reads the article ID and transmits the article ID to the article sorting control apparatus 2. The processor 21 of the article sorting control apparatus 2 registers the article ID read from a certain article and the article detection ID allocated to the same certain article in the auxiliary storage device 34 in association with each other.

The communication interface 35 of the server 3 receives the image information, the processor 31 of the server 3 recognizes the destination included in the image information, and the communication interface 35 transmits the destination recognition result to the article sorting control apparatus 2. When the destination recognition is successful, the destination recognition result includes a recognition success flag and recognized destination information. When the destination recognition fails, the destination recognition result includes a recognition failure flag.

The communication interface 25 receives the destination recognition result from the server 3, and the processor 21 determines the designated sorting destination of the article based on the sorting destination management information and the destination recognition result (ST5). The article ID, the article detection ID, and the destination recognition result of the certain article are registered in association with one another, and the processing proceeds to distribution and sorting processing (ST6).

Figure 5:
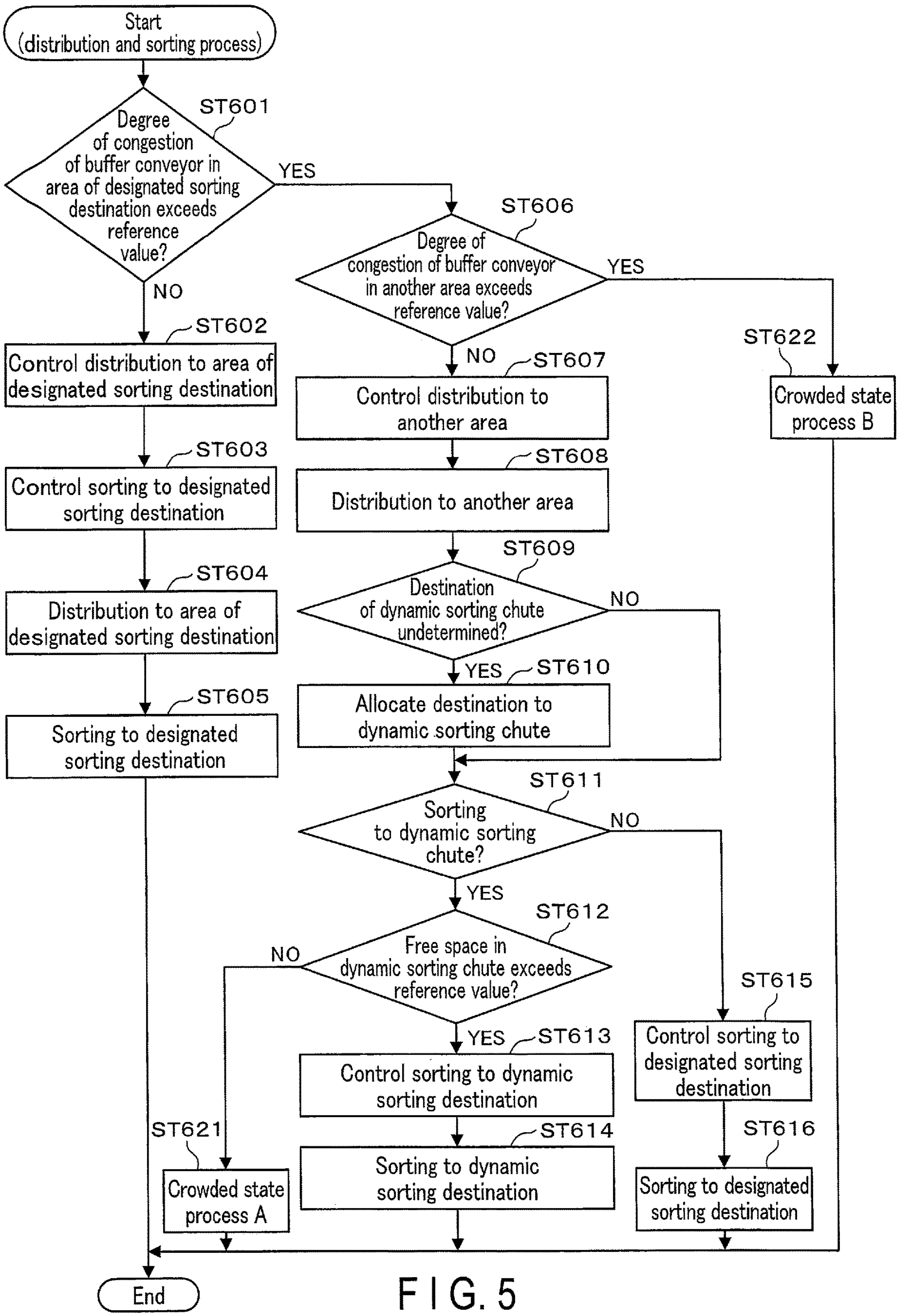
FIG. 5 is a flowchart illustrating an example of distribution and sorting processing by the article sorting system according to the embodiment.

FIG. 5 is a flowchart illustrating an example of distribution and sorting processing by the article sorting system according to the embodiment.

For example, in the case where the designated sorting destination of the article is the area A, when the degree of congestion of the first buffer conveyor 142 in the area A of the designated sorting destination of the article is equal to or less than the reference value (ST601, NO), the processor 21 executes distribution control for distributing the article to the area A of the designated sorting destination (ST602), and executes sorting control for sorting the article to the designated sorting destination based on the determination of the designated sorting destination of the article (ST603). Similarly, in the case where the designated sorting destination of the article is the area B, when the degree of congestion of the second buffer conveyor 143 in the area B of the designated sorting destination of the article is equal to or less than the reference value (ST601, NO), the processor 21 executes distribution control for distributing the article to the area B of the designated sorting destination (ST602), and executes sorting control for sorting the article to the designated sorting destination based on the determination of the designated sorting destination of the article (ST603).

For example, when all the article detection sensors 17 of the first buffer conveyor 142 continue to detect articles for a certain period of time or longer, the processor 21 determines that the degree of congestion of the area A exceeds the reference value. Similarly, when all the article detection sensors 17 of the second buffer conveyor 143 continue to detect articles for a certain period of time or longer, the processor 21 determines that the degree of congestion of the area B exceeds the reference value.

That is, the processor 21 selects the diverging control signal S11 or S12 based on the reference conveyance route allocated to the designated sorting destination of the article, and the communication interface 25 outputs the selected diverging control signal S11 or S12 to the diverging device 13 of the article sorting apparatus 1 (ST602). Further, the processor 21 selects a sorting control signal S2 for sorting the article to the designated sorting destination, and the communication interface 25 outputs the selected sorting control signal S2 to the article sorting apparatus 1 (ST603).

For example, when the designated sorting destination of the article is determined to be the first fixed sorting chute 1511*a*, since the first buffer conveyor 142 is allocated to the first fixed sorting chute 1511*a* as the reference conveyance route, the processor 21 selects the diverging control signal S11 for causing the diverging device 13 of the article sorting apparatus 1 to distribute the article to the first buffer conveyor 142. Alternatively, when the designated sorting destination of the article is determined to be the second fixed sorting chute 1521*a*, since the second buffer conveyor 143 is allocated to the second fixed sorting chute 1521*a* as the reference conveyance route, the processor 21 selects the diverging control signal S12 for causing the diverging device 13 of the article sorting apparatus 1 to distribute the article to the second buffer conveyor 143.

The diverging device 13 distributes the article to the first buffer conveyor 142 or the second buffer conveyor 143 based on the diverging control signal S11 or S12 (ST604). The first buffer conveyor 142 or the second buffer conveyor 143 conveys the article, and the first timing adjustment conveyor 144 or the second timing adjustment conveyor 145 introduces the article into an empty conveyance tray on the circulation conveyor 146. The circulation conveyor 146 circulates and conveys the article introduced into the conveyance tray.

For example, when the article reaches the position corresponding to the sorting chute 15 of the designated sorting destination based on the sorting control signal S2 transmitted from the article sorting control apparatus 2 while the circulation conveyor 146 makes a half-turn, the article sorting apparatus 1 opens the bottom portion of the conveyance tray and sorts the article to the sorting chute 15 of the designated sorting destination (ST605). The processor 21 registers information on the destination of the article and the sorting destination in the auxiliary storage device 24 as sorting history information.

On the other hand, in the case where the designated sorting destination of the article is the area A, when the degree of congestion of the first buffer conveyor 142 of the area A of the designated sorting destination of the article exceeds the reference value (ST601, YES) and the degree of congestion of the second buffer conveyor 143 of the other area, namely, the area B, is equal to or less than the reference value (ST606, NO), the processor 21 selects the diverging control signal S12, the communication interface 25 outputs the selected diverging control signal S12 to the diverging device 13 of the article sorting apparatus 1 (ST607), and the diverging device 13 distributes the article to the second buffer conveyor 143 based on the diverging control signal S12 (ST608). Similarly, in the case where the designated sorting destination of the article is the area B, when the degree of congestion of the second buffer conveyor 143 of the area B of the designated sorting destination of the article exceeds the reference value (ST601, YES) and the degree of congestion of the first buffer conveyor 142 of the other area, namely, the area A, is equal to or less than the reference value (ST606, NO), the processor 21 selects the diverging control signal S11, the communication interface 25 outputs the selected diverging control signal S11 to the diverging device 13 of the article sorting apparatus 1 (ST607), and the diverging device 13 distributes the article to the first buffer conveyor 142 based on the diverging control signal S11 (ST608).

In addition, in a case where the destination allocated in accordance with a situation is not associated with the dynamic sorting chute (ST609, YES), the processor 21 allocates an arbitrary destination to the dynamic sorting chute. For example, the processor 21 allocates a destination of the highest frequency as an arbitrary destination to the dynamic sorting chute based on the sorting history information of each article (ST610). Alternatively, the processor 21 allocates the destination of the article to be sorted as an arbitrary destination to the dynamic sorting chute based on the destination recognition result received in ST5 (ST610).

Here, some examples of allocation of an arbitrary destination to a dynamic sorting chute will be described. For example, when the designated sorting destination of the article is the area A (in this case, the article is distributed to the area B due to the influence of the degree of congestion), the processor 21 allocates the destination of the highest frequency to the second dynamic sorting chute 1522*a* of the area B, and allocates the destination of the second highest frequency to the second dynamic sorting chute 1522*b* of the area B. Further, in this case, the processor 21 may allocate the destination of the third highest frequency to the first dynamic sorting chute 1512*a* of the area A, and allocate the destination of the fourth highest frequency to the first dynamic sorting chute 1512*b* of the area A.

Alternatively, the processor 21 allocates the destination of the highest frequency to the first dynamic sorting chute 1512*a* of the area A and the second dynamic sorting chute 1522*a* of the area B, and allocates the destination of the second highest frequency to the first dynamic sorting chute 1512*b* of the area A and the second dynamic sorting chute 1522*b* of the area B.

Alternatively, the processor 21 allocates the four destinations from the destination of the highest frequency to the destination of the fourth highest frequency respectively to four dynamic sorting chutes (the second dynamic sorting chute 1522*a*, the second dynamic sorting chute 1522*b*, the first dynamic sorting chute 1512*a*, and the first dynamic sorting chute 1512*b*).

Alternatively, the processor 21 allocates, to a dynamic sorting chute, the destination associated with a designated sorting destination of an article to be distributed to another area.

When the designated sorting destination of the article corresponds to a dynamic sorting chute (ST611, YES) and the free space in the dynamic sorting chute exceeds the reference value (ST612, YES), the processor 21 selects the sorting control signal S2 for sorting the article to the dynamic sorting destination, and the communication interface 25 outputs the selected sorting control signal S2 to the article sorting apparatus 1 (ST613).

When the article reaches the position corresponding to the sorting chute 15 of the designated sorting destination (the second dynamic sorting chute 1522*a*, the second dynamic sorting chute 1522*b*, the first dynamic sorting chute 1512*a*, or the first dynamic sorting chute 1512*b*) based on the sorting control signal S2 transmitted from the article sorting control apparatus 2, the article sorting apparatus 1 opens the bottom portion of the conveyance tray and sorts the article to the sorting chute 15 of the designated sorting destination (ST614). The processor 21 registers information on the destination of the article and the sorting destination in the auxiliary storage device 24 as sorting history information.

Further, when the designated sorting destination of the article does not correspond to a dynamic sorting chute (ST611, NO), the processor 21 selects the sorting control signal S2 for sorting the article to the designated sorting destination, and the communication interface 25 outputs the selected sorting control signal S2 to the article sorting apparatus 1 (ST615).

When the article reaches the position corresponding to the sorting chute 15 of the designated sorting destination (the first fixed sorting chute 1511 or 1511*a*, or the second fixed sorting chute 1521 or 1521*a*) based on the sorting control signal S2 transmitted from the article sorting control apparatus 2, the article sorting apparatus 1 opens the bottom portion of the conveyance tray and sorts the article to the sorting chute 15 of the designated sorting destination (ST616). The processor 21 registers information on the destination of the article and the sorting destination in the auxiliary storage device 24 as sorting history information.

When the free space of the dynamic sorting chute is equal to or less than the reference value (ST612, NO), the processing proceeds to a crowded state process A (ST621). When the degree of congestion of the other area, the first buffer conveyor 142 or the second buffer conveyor 143, exceeds the reference value (ST606, YES), the processing proceeds to a crowded state process B (ST622).

Figure 6:
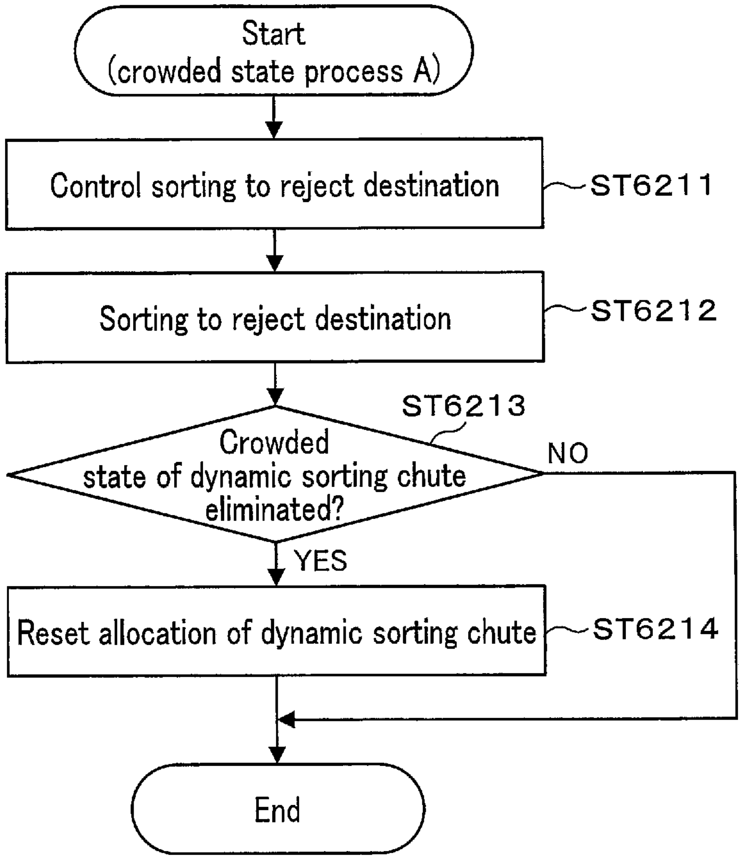
FIG. 6 is a flowchart illustrating an example of a crowded state process A performed by the article sorting system according to the embodiment.

FIG. 6 is a flowchart illustrating an example of the crowded state process A performed by the article sorting system according to the embodiment.

When the free space of the dynamic sorting chute is equal to or less than the reference value (crowded state) (ST612, NO), the processor 21 selects the reject control signal S3, and the communication interface 25 outputs the selected reject control signal S3 to the article sorting apparatus 1 (ST6211). The article sorting apparatus 1 sorts the article to the designated reject destination based on the reject control signal S3 (ST6212). For example, based on the reject control signal S3, the article sorting apparatus 1 opens the bottom portion of the conveyance tray at the timing when the article reaches the position corresponding to the first reject sorting chute 1513 or the second reject sorting chute 1523, and sorts the article into the first reject sorting chute 1513 or the second reject sorting chute 1523 of the designated sorting destination. The processor 21 registers information on the destination of the article and the sorting destination in the auxiliary storage device 24 as sorting history information.

When the container of the dynamic sorting chute in the crowded state is replaced and the crowded state is eliminated (ST6213, YES), the processor 21 resets the allocation of the dynamic sorting chute (ST6214). As a result, the dynamic sorting chute returns to the dynamic state.

Figure 7:
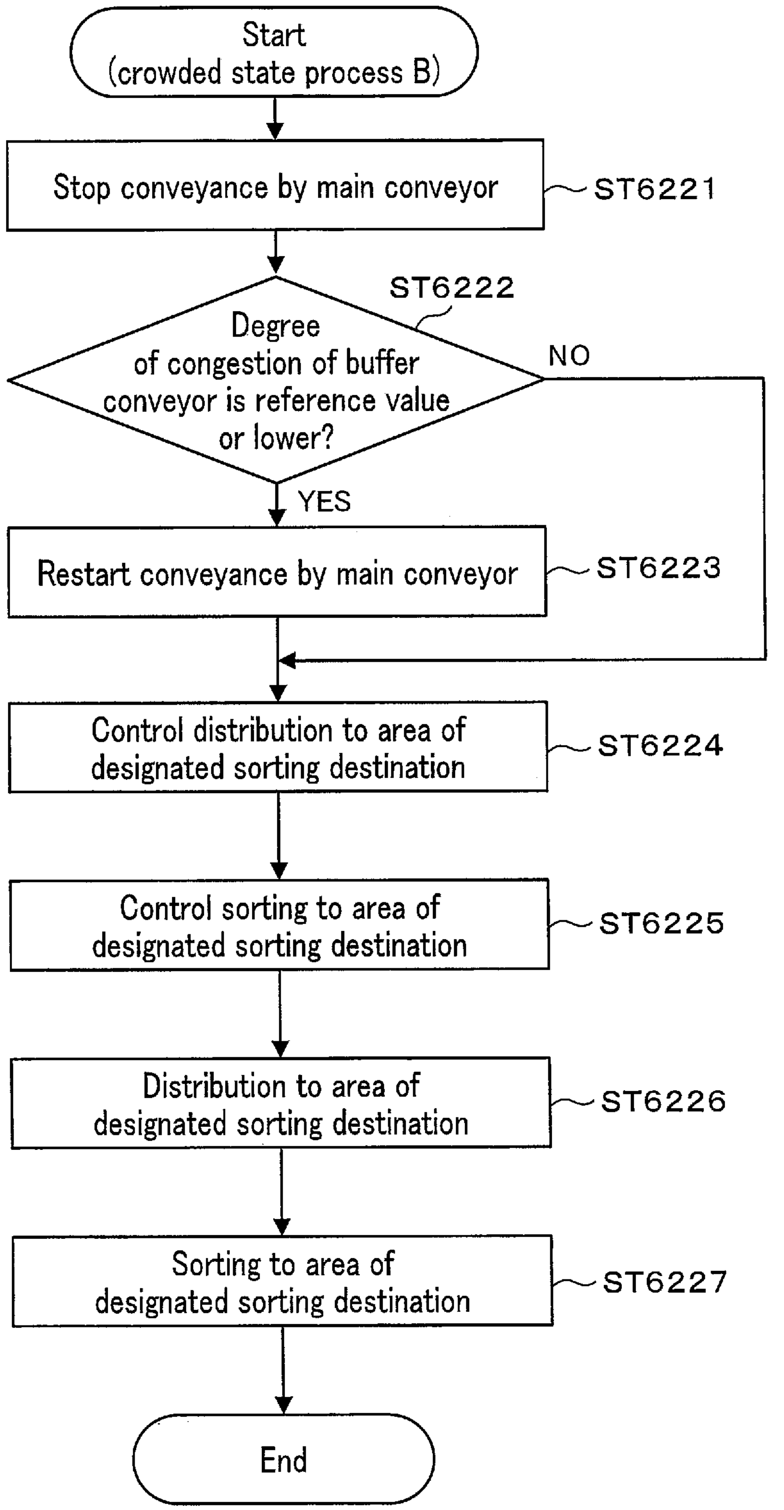
FIG. 7 is a flowchart illustrating an example of a crowded state process B performed by the article sorting system according to the embodiment.

FIG. 7 is a flowchart illustrating an example of the crowded state process B performed by the article sorting system according to the embodiment.

When the degree of congestion of the first buffer conveyor 142 or the second buffer conveyor 143 in the other area exceeds the reference value (ST606, YES), the processor 21 stops the conveyance of the article by the main conveyor 141 (ST6221). When the area of the designated sorting destination of the article is the area A and the processor 21 detects that the degree of congestion of the first buffer conveyor 142 of the area A is the reference value or less (ST6222, YES), conveyance of the article by the main conveyor 141 is restarted (ST6223), distribution control for distributing the article to the area A of the designated sorting destination is executed (ST6224), and sorting control for sorting the article to the designated sorting destination is executed based on determination of the designated sorting destination of the article (ST6225). The diverging device 13 of the article sorting apparatus 1 distributes the article to the first buffer conveyor 142 or the second buffer conveyor 143 in accordance with the distribution control of the processor 21 (ST6226). Further, the article sorting apparatus 1 sorts the article into the sorting chute 15 of the designated sorting destination in accordance with the sorting control of the processor 21 (ST6227). The processor 21 registers information on the destination of the article and the sorting destination in the auxiliary storage device 24 as sorting history information.

As described above, according to the present embodiment, it is possible to provide an article sorting control apparatus, an article sorting control program, and an article sorting system with an improved article processing efficiency. For example, even when the reference conveyance route to the designated sorting destination of the article is congested, the article can be efficiently conveyed and sorted by selecting another conveyance route. In addition, when another conveyance route is selected, a sorting destination is allocated to a dynamic sorting chute. Utilizing the dynamic sorting chute makes it possible to compensate for a partial decrease in processing efficiency due to the use of another conveyance route.

Further, by allocating a sorting destination of a high designation frequency to a dynamic sorting chute or by allocating a designated sorting destination of an article to be distributed to another area to the dynamic sorting chute, the article can be efficiently conveyed and sorted. For example, in the case where an article is distributed to the area B as another area, the article can be sorted by conveyance within a half-turn of the circulation conveyor 146 by allocating a sorting destination of a high designation frequency to a dynamic sorting chute of the area B, or by allocating a designated sorting destination of an article to be distributed to the area B to a dynamic sorting chute of the area B.

Further, by making the conveyance speed of the main conveyor 141 greater than the conveyance speed of the first buffer conveyor 142 and the second buffer conveyor 143 (for example, double the speed or higher), the article conveyance amount per unit time can be increased. Moreover, by using two buffer conveyors, the article can be fed to the circulation conveyor 146 in accordance with the conveyance speed of the main conveyor 141. The embodiment in which two buffer conveyors are used has been described. However, three or more buffer conveyors may be used, and the diverging device 13 may select one buffer conveyor among the three or more buffer conveyors to distribute the article.

While certain embodiments have been described, these embodiments have been presented by way of example only, and are not intended to limit the scope of the invention. These new embodiments can be implemented in various other forms. Various omissions, replacements, and changes can be made without departing from the spirit of the invention. The accompanying claims and their equivalents are intended to cover such forms or modifications as would fall within the scope and spirit of the inventions.

The invention claimed is:

1. An article sorting control apparatus, comprising:

a memory that stores sorting destination management information for conveying an article from a main conveyance path to a circulation conveyance path, via one of a first conveyance route connected to the circulation conveyance path from the main conveyance path via a first sub-conveyance path, and a second conveyance route connected to the circulation conveyance path from the main conveyance path via a second sub-conveyance path, and for sorting the article to a designated sorting destination among a plurality of sorting destinations while circulating the article in one direction via the circulation conveyance path, the sorting destination management information including reference conveyance route information to allocate one of the first conveyance route and the second conveyance route in accordance with each of the sorting destinations, fixed sorting destination information associating a fixed sorting destination among the sorting destinations to a destination, and dynamic sorting destination information associating a dynamic sorting destination among the sorting destinations to a destination that is allocated in accordance with a situation;

a processor configured to select a first diverging control signal or a second diverging control signal based on a designated sorting destination of the article acquired from information read from the article, the sorting destination management information, and degree of congestion of the first and second sub-conveyance paths, and to allocate an arbitrary destination to the dynamic sorting destination; and a communication interface configured to transmit the first or the second diverging control signal selected by the processor to an article sorting apparatus configured to distribute the article from the main conveyance path to the first or the second sub-conveyance path based on the first or the second diverging control signal.

2. The article sorting control apparatus according to claim 1, wherein the communication interface receives an article detection signal from a sensor configured to detect an article conveyed by the first and second sub-conveyance paths, and the processor detects the number of articles in the first and second sub-conveyance paths based on the article detection signal, and determines the degrees of congestion of the first and second sub-conveyance paths based on the number of articles.

3. The article sorting control apparatus according to claim 1, wherein the memory stores the reference conveyance route information that allocates the first conveyance route to a first designated sorting destination, and the second conveyance route to a second designated sorting destination, and when sorting a first article to the first designated sorting destination, the processor selects the first diverging control signal if the degree of congestion of the first sub-conveyance path is equal to or less than a reference value, and selects the second diverging control signal if the degree of congestion of the first sub-conveyance path exceeds the reference value, and when sorting a second article to the second designated sorting destination, the processor selects the second diverging control signal if the degree of congestion of the second sub-conveyance path is equal to or less than the reference value, and selects the first diverging control signal if the degree of congestion of the second sub-conveyance path exceeds the reference value.

4. The article sorting control apparatus according to claim 1, wherein the processor allocates a destination of a highest frequency as the arbitrary destination to the dynamic sorting destination based on sorting history information of each article.

5. The article sorting control apparatus according to claim 3, wherein when sorting the first article to the first designated sorting destination, the processor allocates a destination associated with the first designated sorting destination to the dynamic sorting destination if the degree of congestion of the first sub-conveyance path exceeds the reference value, and when sorting the first article to the second designated sorting destination, the processor allocates a destination associated with the second designated sorting destination to the dynamic sorting destination if the degree of congestion of the second sub-conveyance path exceeds the reference value.

6. The article sorting control apparatus according to claim 1, wherein the processor selects a sorting control signal for sorting the article to a designated sorting destination when sorting the article to the designated sorting destination, and the communication interface transmits the sorting control signal to the article sorting apparatus.

7. The article sorting control apparatus according to claim 1, wherein the processor controls the first and second sub-conveyance paths at a first conveyance speed and controls the main conveyance path at a second conveyance speed greater than the first conveyance speed.

8. The article sorting control apparatus according to claim 1, wherein the processor acquires a destination recognition result from a server configured to recognize a destination based on image information read from the article, and determines a designated sorting destination of the article based on the sorting destination management information and the destination recognition result.

9. A sorting system including the article sorting control apparatus according to claim 1, and the article sorting apparatus, the article sorting apparatus comprising:

the main conveyance path;

the first and second sub-conveyance paths;

the circulation conveyance path; and a diverging device configured to distribute the article from the main conveyance path to the first or the second sub-conveyance path based on the first or the second diverging control signal.

10. A non-transitory computer-readable storage medium storing an article sorting control program for causing a computer to execute:

a procedure to set sorting destination management information, for conveying an article from a main conveyance path to a circulation conveyance path via one of a first conveyance route connected to a circulation conveyance path from a main conveyance path via a first sub-conveyance path, and a second conveyance route connected to the circulation conveyance path from the main conveyance path via a second sub-conveyance path, and for sorting the article to a designated sorting destination among a plurality of sorting destinations while circulating the article in one direction via the circulation conveyance path, the sorting destination management information including reference conveyance route information to allocate one of the first conveyance route and the second conveyance route in accordance with each of the sorting destinations, fixed sorting destination information associating a fixed sorting destination among the sorting destinations to a destination, and dynamic sorting destination information associating a dynamic sorting destination among the sorting destinations to a destination that is allocated in accordance with a situation;

a procedure to select a first diverging control signal or a second diverging control signal based on a designated sorting destination of the article acquired from information read from the article, the sorting destination management information, and a degree of congestion of the first and second sub-conveyance paths, and to allocate an arbitrary destination to the dynamic sorting destination; and a procedure to transmit the first or the second diverging control signal to an article sorting apparatus configured to distribute the article from the main conveyance path to the first or the second sub-conveyance path based on the first or the second diverging control signal.

* * * * *